United States Patent
Mannbro

Patent Number: 5,140,760
Date of Patent: Aug. 25, 1992

[54] ARRANGEMENT FOR ROTATOR UNITS

[76] Inventor: Rolf Mannbro, Jarnmyntsgatan 1, Göteborg, Sweden, S-414 79

[21] Appl. No.: 663,866
[22] PCT Filed: Sep. 8, 1989
[86] PCT No.: PCT/SE89/00482
  § 371 Date: May 6, 1991
  § 102(e) Date: May 6, 1991
[87] PCT Pub. No.: WO90/02849
  PCT Pub. Date: Mar. 22, 1990

[30] Foreign Application Priority Data
Sep. 16, 1988 [SE] Sweden ............... 8803270

[51] Int. Cl.⁵ .................. E02F 3/40; E02F 3/43
[52] U.S. Cl. .................. 37/103; 74/89.13; 74/89.21; 414/687; 414/722
[58] Field of Search ........... 414/687, 722, 744.2; 37/103, 117.5; 74/89.13, 89.21

[56] References Cited

U.S. PATENT DOCUMENTS

| | | | |
|---|---|---|---|
| 3,118,321 | 1/1964 | Rihlec | 74/89.13 X |
| 4,032,025 | 6/1977 | Ross | 414/722 X |
| 4,503,722 | 3/1985 | Suzuki et al. | 74/89.21 X |
| 4,779,364 | 10/1988 | Holmdal | 414/687 X |

FOREIGN PATENT DOCUMENTS

| | | |
|---|---|---|
| 2414046 | 10/1974 | Fed. Rep. of Germany |
| 355055 | 4/1973 | Sweden |
| 2152180 | 7/1985 | United Kingdom |

Primary Examiner—Randolph A. Reese
Assistant Examiner—Arlen L. Olsen
Attorney, Agent, or Firm—Lerner, David, Littenberg, Krumholz & Mentlik

[57] ABSTRACT

Arrangement for rotator units, especially those which are intended for rotation of excavator buckets. It comprises a motor (27) which, together with a transmission (26, 29) which is coupled to a drive wheel (24) in the chain transmission, is arranged in a movable support (14), which is suspended in the housing (6) in a pivotable manner, but free from fixed connections to the housing. In the transmission there is a drive wheel (24) for a chain transmission, which wheel is connected by means of a drive chain (25) to a driven chain wheel (13) included in a shaft system (12) mounted in the housing. Spring elements (30) are arranged to pivot the movable support (14) in such a way that the chain is held tensioned. The suspension of the movable support in the housing is designed in such a way that deformations of the housing resulting from external force effect are not transmitted to the movable support in a way that would deform the latter.

6 Claims, 4 Drawing Sheets

ARRANGEMENT FOR ROTATOR UNITS

TECHNICAL FIELD

The following invention relates to an arrangement for rotator units, especially those which are intended for rotation of excavator buckets and which comprise a housing, a shaft system mounted in the housing with the output shaft of the unit, a motor arranged in the housing, preferably a hydraulic motor for operating the output shaft, and a transmission system arranged between the motor and the output shaft and comprising at least one chain transmission.

PRIOR ART

An excavator bucket is arranged on the supporting excavator in such a way that it can be pivoted in one plane and be guided into different positions in the same plane by means of the excavator arm. Alternatively, equipment other than a bucket, for example equipment for breaking up asphalt, can be suspended in the same way and thus have the same movement possibilities. However, in certain work, it is advantageous if the bucket or the alternative equipment can, in addition, be pivoted about an axis extending in the said plane. In order to achieve this, it is known to arrange on the arm of the excavator a so-called rotator unit which is supported by the arm and in turn supports the equipment in question.

The rotator unit is generally designed with a housing, which has arrangements for securing to the excavator arm and, in the opposite position to these securing arrangements, an output shaft coupling which is designed for securing of the excavator bucket. In the housing there are drive arrangements for turning the shaft coupling and, with it, the excavator bucket or the alternative equipment. In a known embodiment of such a drive arrangement, a hydraulic motor is used for driving the output coupling via a transmission.

TECHNICAL PROBLEM

A rotator unit of this type is subject to extremely great forces. These arise, on the one hand, because the drive mechanism operates at extremely high load, but primarily because the turning mechanism attempts to hold the bucket in a certain position while it is subjected to high rotational forces as a result of the movement of the excavator arm or as a result of other external forces, for example from falling boulders or masses of earth. In this connection it has proven difficult to dimension the unit in such a way that its functioning is not put at risk when great forces of this type arise.

SOLUTION

This protection of the drive mechanism against the effect of deformation of the unit is achieved by means of the invention by virtue of the fact that the motor, together with a transmission connected to the latter and belonging to the transmission system, which transmission is coupled to a drive wheel in the chain transmission, is arranged in a bearing element which is suspended in the housing in a pivotable manner, but free from fixed connections to the housing, and by virtue of the fact that the said drive wheel is connected by means of a drive chain to a driven chain wheel in the shaft system mounted in the housing, and also by virtue of the fact that spring elements are arranged to pivot the movable support, by means of force effect, in such a way that the said chain is held tensioned, in which respect the suspension of the movable support in the housing is designed in such a way that deformations of the housing resulting from external force effect are not transmitted to the bearing element in a way that would deform the latter.

ADVANTAGES

The invention provides an arrangement which protects the drive mechanism from the effect of deformations of the unit, which can arise in the event of extremely high, unexpected loads.

The arrangement also provides a protection against those extra stresses and wear which can arise in certain drive parts as a result of incorrect geometrical conditions on account of especially extensive bearing wear.

DESCRIPTION OF FIGURES

An embodiment of the invention is illustrated in the attached drawings.

PREFERRED EMBODIMENT

Figure 1:
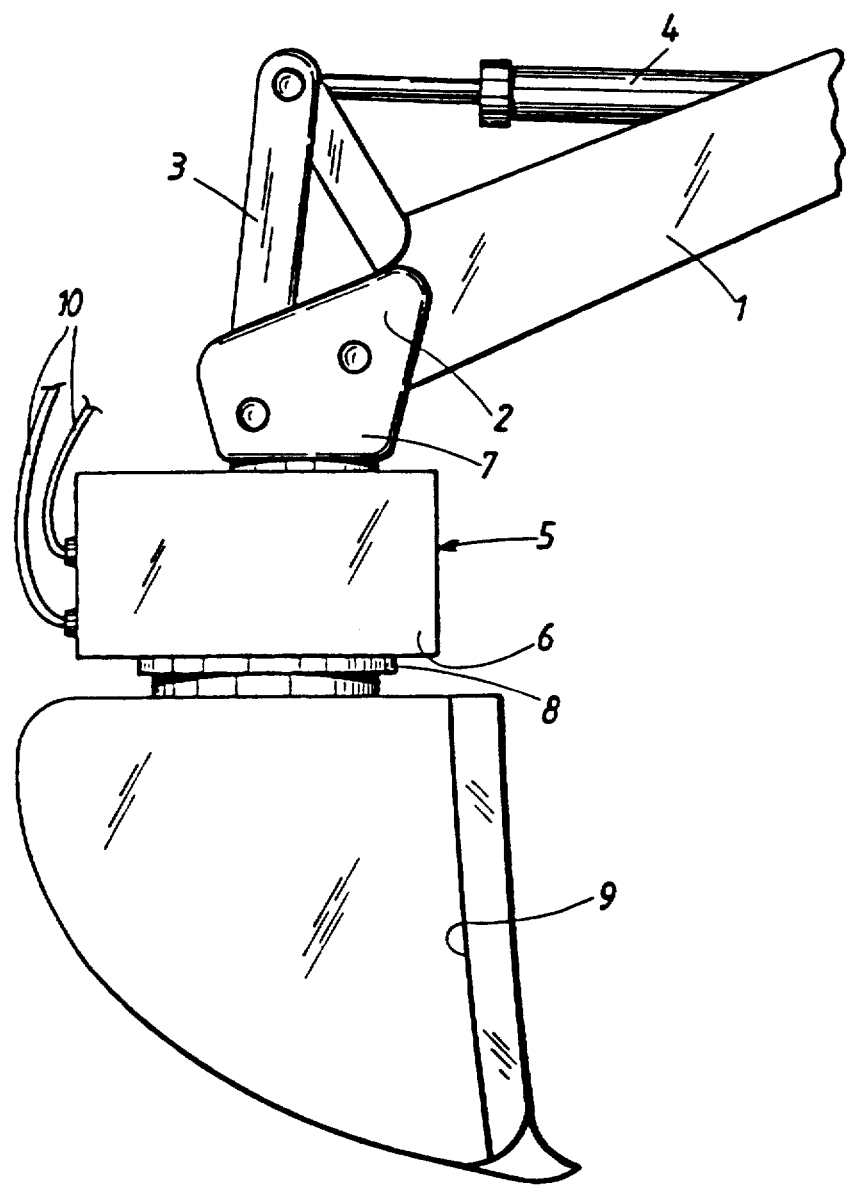
FIG. 1 shows a general view of a rotator unit according to the invention together with its attachment to an excavator arm, and the excavator bucket supported by the unit.

According to FIG. 1, an excavator arm 1 has, at its outer end, an attachment 2 which is pivotable in relation to the arm 1 by means of a linkage 3 and a hydraulic cylinder 4. The arm 1 is movable in its entirety, and here it is assumed that the machine supporting the arm is an excavator of conventional design. The attachment 2 supports a rotator unit 5 designed according to the invention, which unit, in FIG. 1, has the form of a housing 6 with, on its top side, attachment elements 7 which are connected to the attachment 2 of the excavator arm, and an output shaft coupling 8. An excavator bucket is attached to the shaft coupling 8.

The rotator unit 5 has, in the housing 6, a rotation mechanism which is able to rotate the output coupling 8 and, with it, the excavator bucket 9 in relation to the housing 6 and, thus, also in relation to the excavator arm 1. The said drive mechanism is here assumed to be driven hydraulically, as is indicated by two tubes 10 in FIG. 1. These tubes are connected to a hydraulic pump, as will be described hereinafter.

Figure 2:
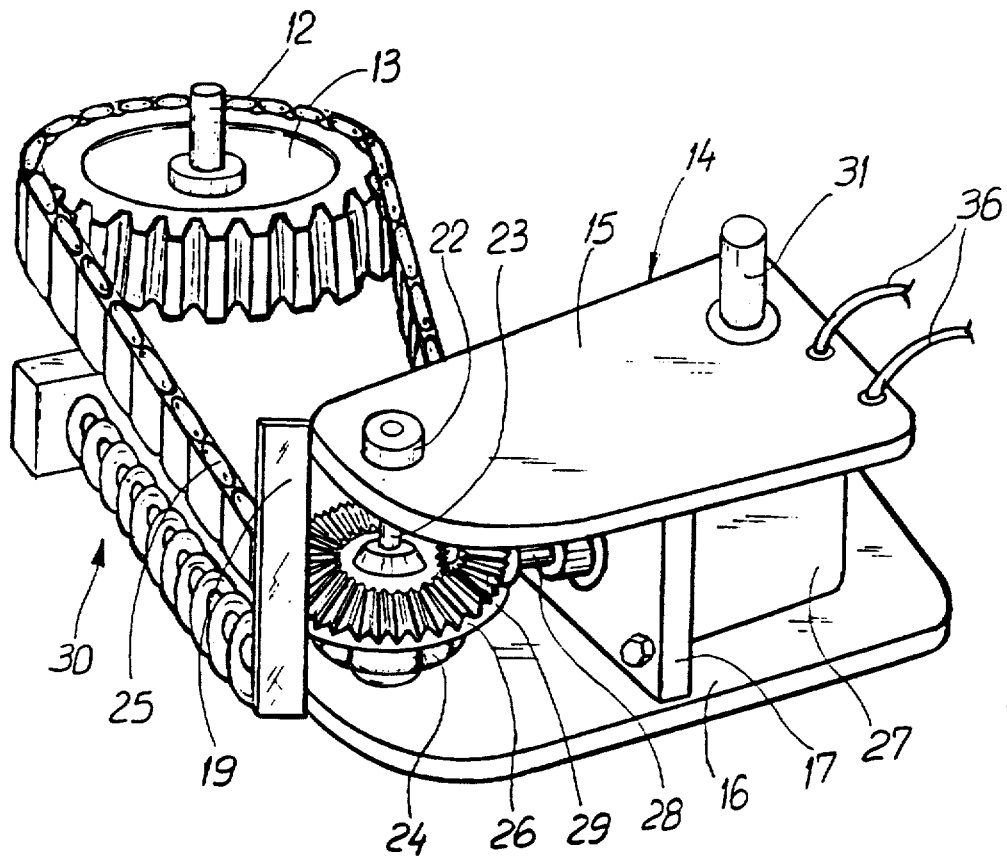
FIG. 2 shows a perspective view of the drive mechanism of the unit without the housing.

FIG. 2 shows the turning mechanism of the rotator unit 5. The housing 6 is not shown, and so the turning mechanism can be seen in its entirety.

This comprises an output shaft 12 which, in a manner not shown, is in driving connection with the said output coupling 8. A chain wheel 13 is fixed o the shaft. The shaft 12 and, with it, the chain wheel 13 are mounted in the housing 6 in a manner not shown in FIG. 2.

To the side of the chain wheel 13 a bearing element 14 is arranged, which forms a support frame made up of an upper plate 15 and a lower plate 16, such that an intermediate space is formed between the plates. The plane of the plates extends parallel to the plane of the chain wheel 13. They are connected by a securing plate 17 transverse to the plates 15 and 16, a shaft bushing 18 and a bearing plate 19. In the movable support 14 there is, in both plates 15 and 16, a shaft bearing 22 for a shaft 23 which, when the movable support 14 is introduced into the housing, runs parallel to the shaft 12 for the chain wheel. Alongside the plate 16 the shaft 23 has a chain drive 24 for a chain 25 which connects the chain wheel 13 and the chain drive. Furthermore, the shaft 23 has a conical gear wheel 26. The two wheels 24 and 13 are connected in rotationally fixed manner.

Attached to the securing plate 17 is a hydraulic motor 27 whose output shaft 28 has a gear 29 which is in engagement with the conical gear wheel 26.

A compression spring element 30 is tensioned between the shaft system for the chain wheel 13, in which the shaft 12 is included, and the movable support 14, and it seeks to press these two parts away from each other during tensioning of the chain 25. It can be seen from FIGS. 2-4 that the compression spring element 30 bears, on the one hand, against a retainer 34 secured to the housing 6 and, on the other hand, the plate 19 on the movable support 14.

Figure 3:
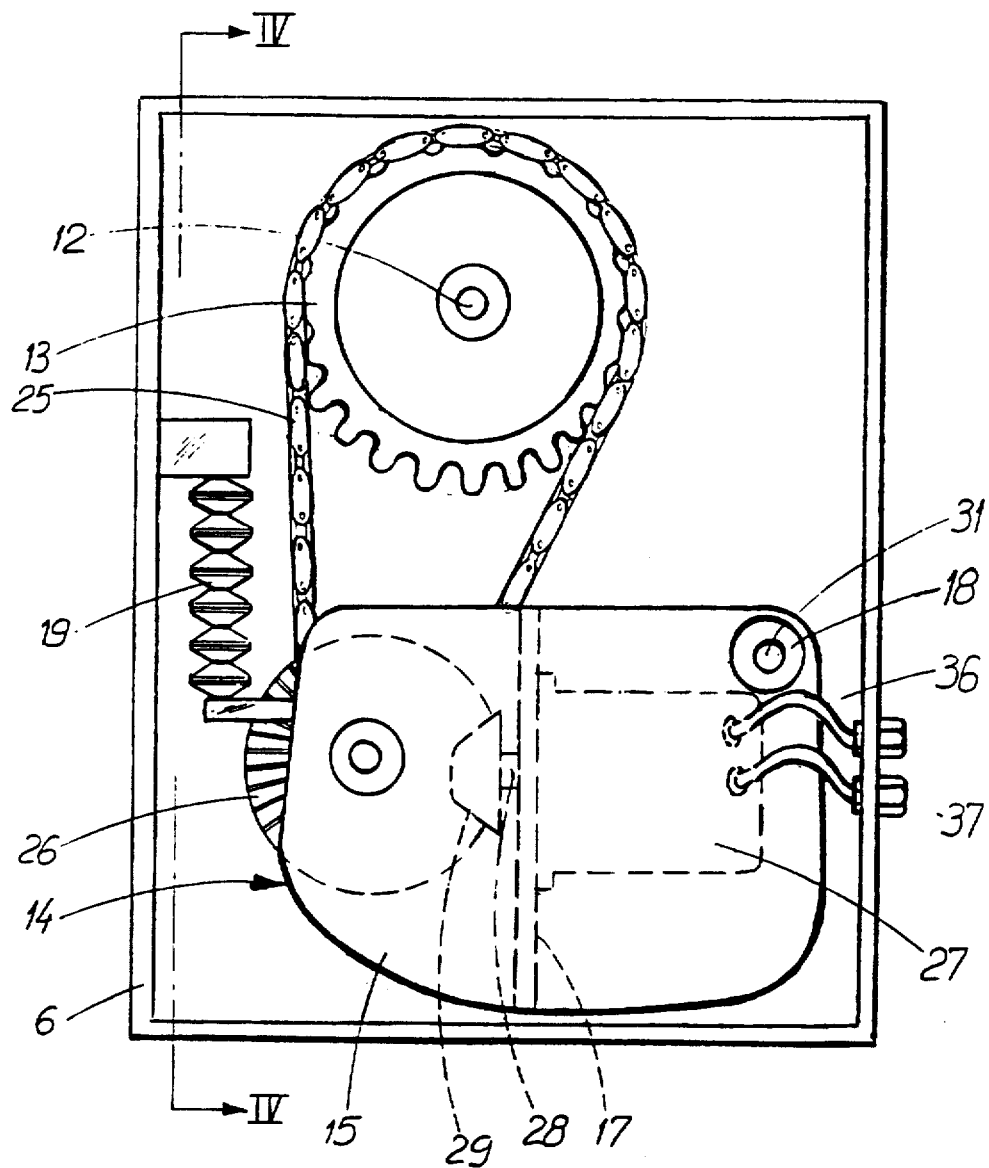
FIG. 3 shows a front view of the unit, whose housing is partially removed in order to show the internal parts.

The drive mechanism now described is shown in FIG. 3 introduced into the housing 6, whose one side has, however, been removed in order to show the mechanism clearly. A part of the chain wheel 13 has also been cut away in order to show the underlying parts. The retainer 34 forming the support for the compression spring element in the shaft system is shown. The support for the other end is, as has been mentioned, the plate 19 on the movable support 14. As is shown in the figure, the compression spring element 30 can consist of a number of cup springs which are stacked on top of each other and which are supported by a rod through the centre holes of the cups. This rod is mounted in the retainer 34 and the plate 19, but in such a way that the movable support 14 can move slightly in the direction towards and from the shaft system of the chain wheel 13. The movable support can thus pivot about the shaft 31 which extends through the bushing 18 in the movable support and is mounted in the housing 6. It can also be seen that the hydraulic motor 27 is provided with feed tubes 36 for which couplings 37 are arranged on top of the housing.

Figure 4:
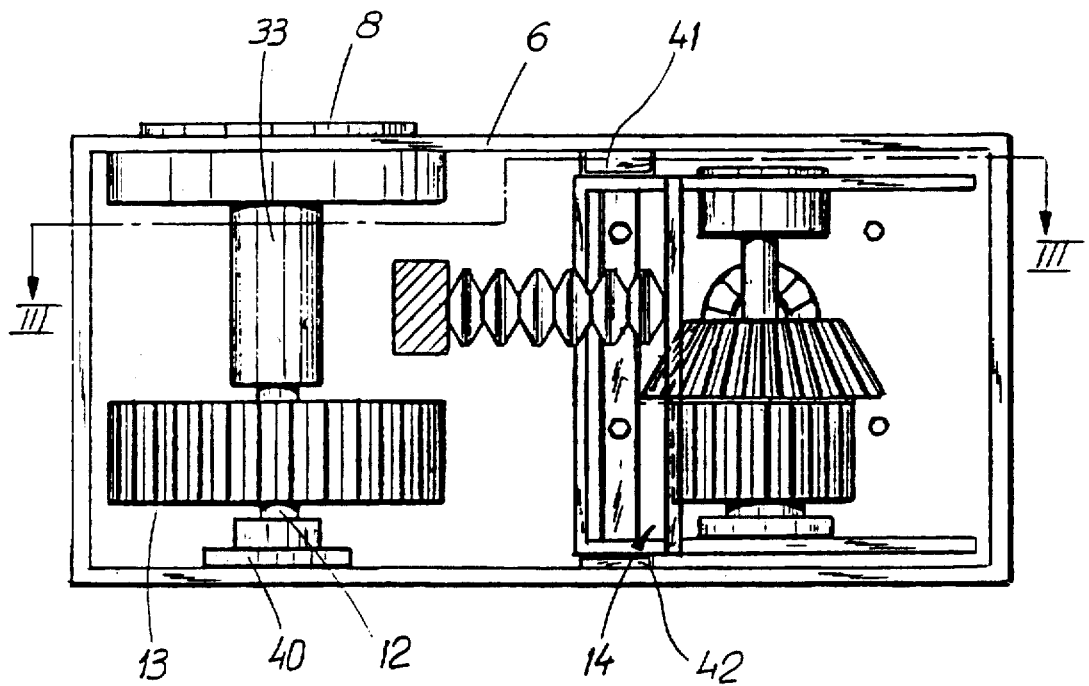
FIG. 4 shows the unit in a side view, from which the drive mechanism can be seen.

FIG. 4 is a side view of the mechanism inside the housing 6, with its front wall in the figure removed. The figure also shows the majority of the parts previously described in connection with FIG. 3, and also the shaft coupling 8 which is secured on the shaft 12 and is thus connected to the chain wheel 13. A bearing, designated 40, for the other end of the shaft 12 is also supported by the housing. The shaft 31 in the shaft bushing 18 of the movable support 14 is mounted in the housing 6 at 41 and 42, either fixed in supports, in which respect the bushing 18 acts as a pivot bearing, or alternatively directly mounted with its ends in the housing.

It has been explained above that the drive mechanism comprises a drive source, the hydraulic motor 27, and an output shaft system centred about the shaft 12 and provided with the coupling 8. In between these two parts, the driving motor and the driven coupling, the drive mechanism comprises a transmission, first consisting of the conical gear transmission with the motor gear 29 and the gear wheel 26, and the chain transmission with the drive 24 and the gear wheel 13. In both transmissions a gear reduction of the motor speed and a corresponding increase in the torque accordingly take place. As has been mentioned, a very high torque is required on the output coupling in the said use. Thus, the forces in the transmission are great and it is important that the parts of the transmission co-operate in the correct positions, so that uneven bearing in the contact surfaces does not arise. However, it has proven difficult or impossible to ensure the correct positions if the incorporated parts are each mounted directly in the housing, because the latter is subjected to high deformation forces in the heavy work which occurs. These forces lead to such deformations that the transmission parts can no longer co-operate correctly.

However, these difficulties are avoided in the mechanism according to the invention. Thus, the hydraulic motor 27 and the transmission to which it is directly connected, comprising the gear 29 and the gear wheel 26, are mounted in the movable support 14 which is in turn mounted in the housing in such a way that deformations of the housing do not result in deformations of the movable element. The shaft system for this first transmission is thus not subject to any incorrect positions resulting from the effect of deformations of the housing.

A correct distance is at all times maintained between the wheels of the chain transmission by means of the spring force from the spring element 30. The movable support 14 which constitutes the bearing for the gear drive 24 of the chain transmission is not subject to such great deformation movements as it would be if it were directly secured in the housing. The deformation movements which can occur between the bearing for the chain drive and for the chain wheel can be absorbed by the chain 25 which, to a certain extent, permits such movements. This can take place without any excessively great tensional forces arising in the chain, on account of the fact that a correct chain tensioning is at all times maintained by means of the compression spring arrangement 30.

Because the chain is loaded by spring forces and not by tensioning of connecting wheels in fixed positions, the tensional force of the chain can also be adapted upon movements and abnormal positions of these wheels. Such abnormal positions can occur in a chain transmission as a result of bearing wear, so that the chain wheels can no longer be held in defined positions but move in the bearings depending on the external force effect. If, on the other hand, the chain is tensioned by spring force, it can continually adapt to the momentarily assumed position.

INDUSTRIAL USE

As has emerged from the above, an important embodiment in the invention is a hydraulic motor-driven rotator unit in which, for the necessary gear reduction of the motor speed, use is made, on the one hand, of at least one gear transmission and, on the other hand, one chain transmission. The basic idea of the invention is that the hydraulic motor is mounted together with the gear transmission in a movable support which is not constructed directly together with the housing of the unit. The chain transmission runs between a drive wheel belonging to the movable support and a driven wheel belonging to an output shaft system, which is mounted in the housing of the unit. The chain transmission is held tensioned by means of a spring element between the movable support and the housing of the unit. Deformation as a result of great forces on the housing affect the chain transmission which, however, is at all times held tensioned by means of the spring element, while the movable support is mounted in the housing in such a way that the transmission system, which is supported by the latter, is not subjected to the deformations which the housing may suffer.

In this embodiment and basic principle, the transmission system does not have to be designed in the manner described and illustrated, in other words as a conical transmission, but instead other embodiments are also conceivable within the scope of the invention. Thus, it is conceivable to use a transmission with cylindrical gear wheel or with a worm gear, for example. It is also conceivable for the driven wheel of the chain transmission to be coupled in turn to a transmission system which is supported by the output shaft system, if this transmission system is free from the housing in such a way that it does not take part in deformations of the latter. It is conceivable, for example, for the chain wheel to form part of a planetary gear, mounted entirely and held within the output shaft system.

I claim:

1. A rotator unit for the rotation of a workpiece extending from an arm comprising, a housing, support means pivotally mounted in said housing, motor means mounted in said support means for providing power to the rotator unit, an output shaft at least partially disposed in said housing and extending from said housing for rotatably engaging said workpiece, transmission means mounted in said support means including chain means for transferring power from said motor to said output shaft, and spring means disposed between said housing and said support means for maintaining a predetermined tension on said chain means, whereby said transmission means is protected from the effect of forces applied to said housing.

2. The rotator unit of claim 1, wherein said workpiece comprises an excavator bucket.

3. The rotator unit of claim 1, wherein said motor means comprises a hydraulic motor.

4. The rotator unit of claim 1, wherein said transmission means includes a first conical gear wheel rotatably coupled to said motor means, a second conical gear wheel arranged for meshed engagement with said first conical gear wheel to facilitate radial movement thereto, transmission shaft means for supporting said second conical gear wheel, said transmission shaft means being rotatably mounted to said support means, a first chain drive wheel arranged on said transmission shaft for radial movement therewith, and a second chain drive wheel spaced from said first chain drive wheel and coupled thereto by said chain means, said second chain drive wheel secured to said output shaft to generate rotational movement thereto.

5. The rotator unit of claim 1, including pivot shaft means for pivotally mounting said support means in said housing, said pivot shaft means having an axis therethrough, said spring means including a first end and a second end, and spring support means mounted on said support means and disposed a spaced distance from said pivot shaft means, said first end of said spring means being mounted on said spring support means and said second end of said spring means being mounted on said housing.

6. The rotator unit of claim 5, wherein said housing includes fixed retainer means, said second end of said spring means being mounted on said fixed retainer means, whereby when a predetermined amount of force is exerted upon said output shaft, said spring means transfers a portion of said force to said spring support means so that said support means will pivot about said axis of said pivot shaft means.

* * * * *

UNITED STATES PATENT AND TRADEMARK OFFICE
CERTIFICATE OF CORRECTION

PATENT NO. : 5,140,760

DATED : August 25, 1992

INVENTOR(S) : Mannbro

It is certified that error appears in the above-identified patent and that said Letters Patent is hereby corrected as shown below:

```
Column 2, line 45, "bucket is" should read --bucket 9 is--.
Column 4, line 19, "element" should read --support--.
```

Signed and Sealed this

Twenty-first Day of September, 1993

Attest:

BRUCE LEHMAN

Attesting Officer     Commissioner of Patents and Trademarks